US006668203B1

(12) United States Patent
Cook et al.

(10) Patent No.: US 6,668,203 B1
(45) Date of Patent: Dec. 23, 2003

(54) STATE MACHINE ANALYSIS OF SENSOR DATA FROM DYNAMIC PROCESSES

(75) Inventors: William R. Cook, Albuquerque, NM (US); John M. Brabson, Albuquerque, NM (US); Sharon M. Deland, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 359 days.

(21) Appl. No.: 09/844,028

(22) Filed: Apr. 26, 2001

(51) Int. Cl.[7] .............................................. G05B 19/18
(52) U.S. Cl. ........................... 700/65; 700/27; 702/182; 702/188; 703/17; 703/22; 705/7; 705/11; 717/104
(58) Field of Search ................................ 700/27, 65, 9, 700/86–88, 103; 703/17, 22; 707/103; 717/104; 702/182, 188; 705/7, 11

(56) References Cited

U.S. PATENT DOCUMENTS

| | | | |
|---|---|---|---|
| 4,141,006 A | | 2/1979 | Braxton ........................ 379/40 |
| 5,394,347 A | * | 2/1995 | Kita et al. ...................... 703/2 |
| 5,485,600 A | * | 1/1996 | Joseph et al. .................. 703/13 |
| 5,586,066 A | | 12/1996 | White et al. ................. 702/181 |
| 5,761,090 A | | 6/1998 | Gross et al. ................... 714/26 |
| 6,408,262 B1 | * | 6/2002 | Leerberg et al. ................ 703/2 |
| 6,434,512 B1 | * | 8/2002 | Discenzo ..................... 702/184 |
| 6,477,439 B1 | * | 11/2002 | Bernaden et al. ........... 700/103 |
| 2002/0103550 A1 | * | 8/2002 | Andrews ...................... 700/65 |

OTHER PUBLICATIONS

Brabson, "Finite State Machine Analysis of Remote Sensor Data", Proc. 40th Annual Mtg of the Institute of Nuclear Materials Mgmt, AZ, Jul. 1999.*

* cited by examiner

Primary Examiner—Anil Khatri
Assistant Examiner—Crystal J. Barnes
(74) Attorney, Agent, or Firm—Kevin W. Bieg

(57) ABSTRACT

A state machine model analyzes sensor data from dynamic processes at a facility to identify the actual processes that were performed at the facility during a period of interest for the purpose of remote facility inspection. An inspector can further input the expected operations into the state machine model and compare the expected, or declared, processes to the actual processes to identify undeclared processes at the facility. The state machine analysis enables the generation of knowledge about the state of the facility at all levels, from location of physical objects to complex operational concepts. Therefore, the state machine method and apparatus may benefit any agency or business with sensored facilities that stores or manipulates expensive, dangerous, or controlled materials or information.

5 Claims, 3 Drawing Sheets

STATE MACHINE ANALYSIS OF SENSOR DATA FROM DYNAMIC PROCESSES

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

The present invention is directed to the analysis of raw sensor data from dynamic processes at a facility for the purpose of remote facility monitoring and inspection, and more particularly to a method and apparatus for identifying the actual processes that were performed at the facility during a period of interest using a state machine model and comparing the actual processes identified to the expected processes declared by an inspector.

The use of sensor systems for monitoring and tracking the status of high value assets and processes has proven to be less costly and less intrusive than the on-site human inspections that they are intended to replace. Such systems can help to minimize the need for costly material inventories and human exposure to hazardous materials. In general, such a remote monitoring system may be of benefit to any agency or business with sensored facilities that stores or manipulates expensive, dangerous, or controlled materials or information of any kind.

Typical government applications for such sensor systems include nuclear material handling sites with sensored operations (for example, weapons facilities that fabricate, transport, or store nuclear material), facilities secured with detection sensors where controlled, expensive, or classified materials must be accessed and stored, and facilities that must safely handle expensive, dangerous, or controlled materials of any kind (conventional weapons, high explosives, experimental reactors, etc.)

Industrial applications for such sensor systems include facilities with sensored operations (for example, nuclear power plants, pharmaceutical companies, and chemical manufacturers), sites that must monitor access to expensive or one-of-a-kind objects (satellite components, fine-line lithography equipment, etc.), and plants that must electronically monitor complicated, human-error prone operations for safety or efficiency (power plants, computer chip producers, etc.)

In the realm of international inspections, such a sensor system can save inspectors from numerous trips to foreign facilities. In addition, facility inspectors can automate the current data inspection/verification process, allowing them to concentrate on process abnormalities, and saving them from unnecessary attention to normal processing.

Such monitoring systems, however, present a classic information overload problem to an inspector trying to analyze the resulting sensor data. These data are typically so voluminous and contain information at such a low level that the significance of any single reading (e.g., a door open event) is not obvious. Sophisticated, automated techniques are needed to identify and extract expected processes in the data and isolate and characterize the remaining patterns that may be due to undeclared or abnormal activities. A key issue from an operational perspective is that it is not feasible to expect a human inspector to manually perform all of the required analysis reliably.

The data gathered by monitoring systems come from a wide variety of sensors including discrete state sensors (e.g., breakbeams), analog sensors that measure continuous physical quantities (e.g., tank levels or temperatures), and sensors that measure spectra (e.g., chemical photo analyzers and gamma radiation spectra). Analysis of this data requires extracting, correlating, and classifying patterns in the sensor data and interpreting them in terms of the allowed activities at the monitored facility. In most situations, it is not obvious how to combine the discrete, analog, and spectrum sensor data in ways to draw useful conclusions about the dynamic processes being monitored.

There are many factors that make sensor data analysis both difficult and labor intensive:

- the processes being monitored can have a tremendous degree of variability (e.g., activities in the process may not always be performed in the same order);
- many of the sensors provide only minimal information, indicating activity but not conveying sufficient information to reliably classify the nature of the activity;
- interpretation of the raw sensor data is facility- and process-specific, requiring a high degree of human training;
- the data may be incomplete (e.g., two objects may pass through a breakbeam with only one resultant trigger);
- there may be "noise" from background activities, either expected or unexpected (e.g., two activities occurring simultaneously);
- the interpretation of the raw sensor data may depend on the current or past states of multiple sensors or subtle timing differences between events coming from multiple sensors;
- sensors tend to drift away from their calibration points; and
- measurements of continuous physical quantities have inherent uncertainty.

All of these factors must be accounted for in assessing how well the events from many sensors correlate with expected, normal behavior.

Traditional systems typically monitor static situations. For a storage facility, for example, a simple monitoring system that checks sensor values against static set points is quite adequate. However, for facilities with dynamic processes, it is no longer sufficient simply to check periodically the readings of each sensor against a fixed threshold value. In particular, analysis of data from dynamic processes differs from static facilities in important ways:

- interpretation of the data from a sensor that is within threshold often depends on knowing the current status (state) of other objects or processes in the facility;
- verification of correct operation of a facility often requires knowledge about correct sequencing of processes and sub-processes;
- correct identification of what processes have occurred can require knowledge of the relative timing between sensor events; and
- correct assessment of the current status of a facility can require knowledge of the status of the facility at any time in the past.

There remains a need for facilities with dynamic processes for an inspector to be able to detect situations where knowledge about the combined states of multiple sensors is required to make judgements about possible diversion, safety, security, sensor system integrity, sensor data quality, or other, more abstract concepts.

SUMMARY OF THE INVENTION

The present invention, hereinafter referred to as Knowledge Generation (KG), solves the problem of information overload at facilities having multiple dynamic processes with an automated data analysis engine that runs a state machine model of the processes and sensors at the facility.

The invention comprises a method that analyzes the raw sensor data, advancing the state machine through a series of object state transitions, thereby converting and combining the outputs from many sensors into operator domain level information, or actual processes, that occurred at the facility during the period of interest. The method further compares the actual processes identified against a set of expected processes declared by an inspector (these would normally be the legal or allowed operations), and then presents the differences between processes that actually occurred and those that were declared by the inspector in the process level domain.

The present invention also comprises an apparatus for performing the KG analysis. A processor connects with an input/output system and storage. A sensor array monitors the dynamic processes at the facility. The apparatus also comprises means for inputting the raw sensor data and the facility characteristics into the processor to define event rules in the storage, converting the raw sensor data into events with the event rules, advancing the state machine through a series of object state transitions using with the events, and grouping the transitions into the actual processes. The apparatus further comprises means for inputting expected operations into the processor to construct a process declarations file and comparing the declared processes to the actual processes to identify undeclared processes that occurred at the facility during the period of interest. This information is output to the inspector through a user interface.

The difference between KG and existing analysis systems is the use of finite state machines to model not just the facility sensor system, but also user objects and processes. KG is the only known automated method to monitor dynamic processes, extract the actual processes that occurred from the raw sensor data, compare the actual processes against a set of processes declared to represent truth by the inspector, and explicitly detect undeclared or covert processes.

KG can perform the analysis of static facilities, but it can also dynamically track and check the states of dynamic processes where material is transformed into different states or forms or transported to different locations. KG can track processes at a much higher level than traditional systems since it assembles actual macro-processes out of the raw sensor data. The finite state machines can also handle multiple simultaneous processes, tracking not only the sensor states but also the states of the process objects and higher level user concepts (safety, security, probability of diversion, etc., sometimes called "goals") and dynamically and continuously track states and values for these concepts during facility operations. Since KG has knowledge of the state of the system at all levels of the user's system, it can more intelligently report to the inspector what caused any deviation from normal and the impact of the abnormality on the facility goals.

Although the KG system analysis engine was written with international nuclear material safeguards, nonproliferation, and transparency in mind, there is no information about any particular facility in the analysis engine software. Examples of where KG can be applied include anywhere it is important to:

check for sensor threshold errors;

check for inconsistent readings between redundant sensors;

check for timing between sensors events;

track the locations of objects affected by the processes at the facility;

track the states of objects at the facility;

track the health of the monitoring system itself;

track the integrity of the sensor data;

verify that only the declared processes occurred;

identify processes which occurred which were unexpected;

identify processes which were started but not completed;

identify processes which were performed out of order;

detect intrusion into or exit from a secured area;

verify that safe or proper operating procedures have been followed; or evaluate other concepts such as integrity, reliability, appropriate use, etc.

Thus, a primary advantage of KG is the ability to generate knowledge about the state of the facility at all levels. Because the user processes are modeled in state machines, information from multiple sensors within the sensor system can be combined to form knowledge about the facility. That is, data points are combined into events; events are combined into activities; activities are combined into processes. These activities might further be taken into a higher-level state machine to monitor the safety of operations of the facility. The ability to raise data points to higher levels of knowledge is only limited by the creativity of the site expert who is designing the state machines and the quality of the sensor data available.

Another advantage of KG is the ability to analyze dynamic processes. Traditional data analysis of sensored systems has concentrated on static systems where the report from any sensor is subjected to a threshold check, and an alarm is raised if the threshold is exceeded. Modeling a facility as a state machine enables the extraction of information from sensor data streams that depend not only on the state of one sensor, but also on the sensor's past states, and the current and past states of any or all other sensors in the system. KG dynamically tracks the state of the system and can compare readings from multiple sensors, check timing between events, make comparisons against historical data, etc. Since KG combines the data from many sensors and tracks the state of the entire system, it can make intelligent decisions about the state of the entire system.

Another advantage of KG is the ability to handle multiple simultaneous processes. While human inspectors typically can examine a data set for one well-defined characteristic, KG can accurately and reliably track many performance/safety/security measures. This ability to monitor multiple dimensions of the process can vastly increase the confidence of facility inspectors that process steps are being monitored and performed correctly. In addition to monitoring multiple metrics simultaneously, KG can track complex processes which may require critical times, critical values, and critical sequences, any or all of which may be revealed only by simultaneously comparing the data streams from multiple sensor.

A further advantage of KG is the ability to extract useful information from an imperfectly sensored system. Imperfectly sensored means that sensors may not function perfectly or monitor the best feature of the system to capture the best information. This advantage is accomplished by providing alternate paths through the facility state machine. This provision has proved to be crucial, for example, when the sensor system in a facility was designed to optimize detection of security violations, but the inspector later needs to make conclusions about the safe usage of equipment.

Another advantage of KG is the ability to dispatch system functions or equipment to gain more information about a detected abnormality. As an example, KG has been used to issue a command to a robot to travel to a remote area to test a sensor that appeared to be failing. It could similarly be used to dispatch a robot to investigate evidence of diversionary activities (take pictures, detect motion, etc.).

Furthermore, KG has the ability to reconstruct the history of a process. Since state machines are deterministic, it is possible to reconstruct the path that a process has taken to arrive at its current state. This ability to track back through the history of a process makes the task of determining where an abnormal process started to fail much easier.

A further advantage of KG is the ability to quickly produce repeatable results so that the description of the facility processes can be closely "tuned" to accept normal processes and reject abnormal processes that barely fall outside normal operations. The difference between a normal process and one which has been minutely perturbed (via out of order steps, covert activities, small timing differences, etc.) will often appear visually identical to a human inspector. The increased discrimination ability enabled by KG means that human inspectors are required only for the analysis of a small number of processes—those that are determined by the analysis engine to fall outside the normal operational limits. Thus, human inspectors can examine much more closely the few abnormal operations detected by KG.

A further advantage of KG is the ability to perform constrained process level comparisons. The inspector declarations about what is expected to happen might be constrained by a number of different conditions that occur in real processes. For example, a process may be declared to have explicit time constraints. Declared processes may also be constrained to occur either before or after parts of other declared processes (relative timing). Declared processes may also be constrained by number (optional processes).

Finally, KG can extract what processes actually occurred without a set of declared processes from the inspector. In this application, the comparison between actual and declared is omitted, and the inspector is presented with a list of what processes actually happened. Since the sensor data from a remote power plant is typically examined by hand, the ability to extract what processes actually occurred from raw data is a vast improvement in speed, repeatability, fineness of the analysis, and accuracy, compared to manual analysis.

BRIEF DESCRIPTION OF THE DRAWINGS

The accompanying drawings, which are incorporated in and form part of the specification, illustrate the present invention and, together with the description, explain the invention. In the drawings, like elements are referred to by like numbers.

DETAILED DESCRIPTION OF THE INVENTION

1. Definitions

Figure 1:
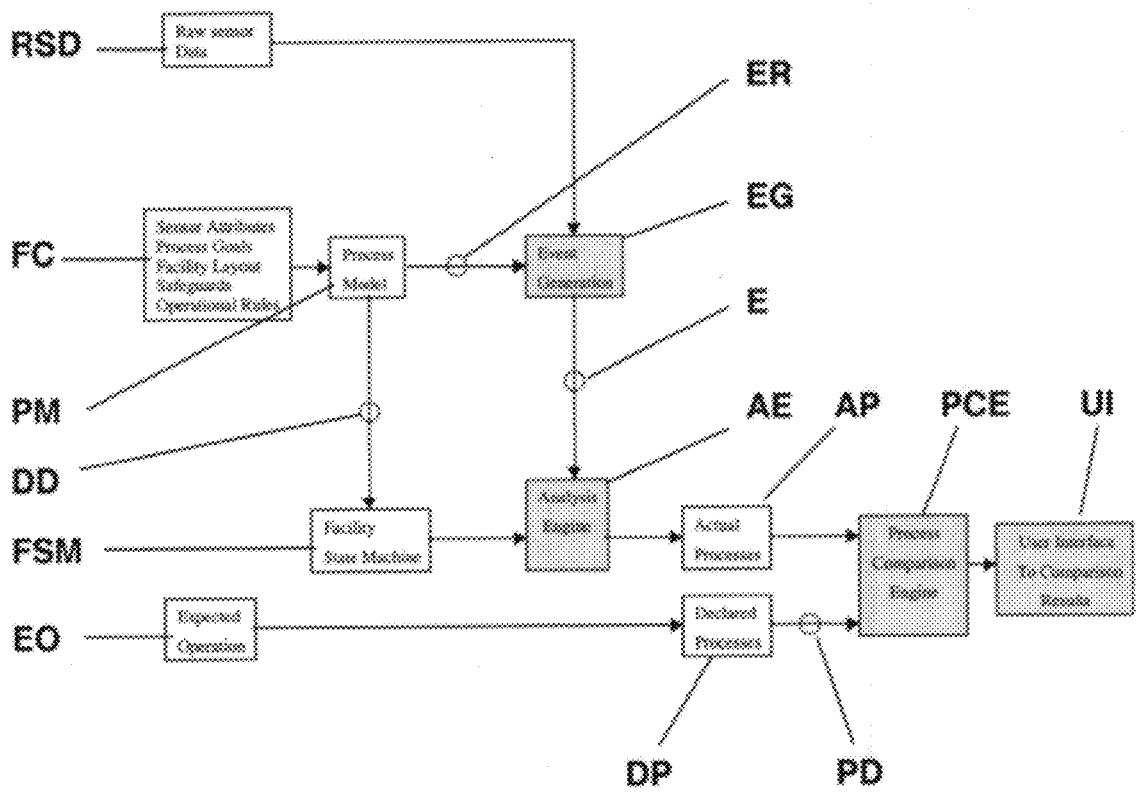
FIG. 1 is a block diagram of the Knowledge Generation analysis system.

It is understood that the terminology used herein is for the purpose of describing particular embodiments only and is not intended to be limiting.

The term "activity" refers to a significant action, as defined by a site expert. It represents the successful completion of one or more events. Activities provide a convenient way for the state machine designer to group events, generally into human inspector discernable blocks. Intuitively, an activity should be visible to an inspector at the facility; that is, an inspector should be able to tell by inspection whether or not an activity has occurred. The state machine will track the starts and ends of activities in the same way that it tracks the starts and ends of processes. An example of this structure, depicting the activities and processes required to drive a car to work, is shown schematically in Table 1.

TABLE 1

| | |
|---|---|
| Drive Car to Work | // The root process |
| Start Car | // A process which can be declared |
|    Put foot on brake | // An activity |
|    Put key in ignition | // Another activity |
|    Turn key to on | // Another activity |
| Drive Car | // Another declarable process |
|    As required, put in reverse | // May need to back out of the driveway |
|    Accelerate | // Assume we have an automatic shift |
|    As required, stop | // Need to allow some observance of traffic signals |
| Stop Car | // Another declarable process |
|    Shift to Park | // An activity |
|    Turn key to off | // An activity |

The processes outlined in Table 1 are the first two levels. The activities are shown in the third level, but are not limited to the third level. An activity may be made up of other activities, nested as deeply as necessary.

The term "application object" refers to an object known in the user's domain. Fuel bundle, hot cell, breakbeam sensor, state-of-health of the breakbeam, integrity of the sensor data, safety performance measures, and security of critical materiel are examples of application objects. If an application object is modeled for KG, it will normally be assigned an initial state that can be modified by events. An application object can both receive and send events. There should generally be one state machine for each application object. In general, the state of an application object falls into one of five categories of increasing complexity:

- locations of physical objects (robot at door, bundle in tray, flasks on table, etc.);
- conditions of physical objects (flask welded, tray filled, etc.);
- conditions in the health of physical objects (breakbeam failed, network reliability failing, etc.);
- process states (move to silo complete, box assembly stalled, etc.); and
- concept states (security uncompromised, safety OK, system integrity suspect, etc.).

Typically, the state machines of the lower categories feed events to the state machines of the higher categories, indicating advancement from one state to the next state at the higher level.

The term "Analysis Engine" refers to the software core of the KG process. This is the software which reads in the events detected in the sensor data. It uses these events to drive the state machine models that describe the facility and its processes. The Analysis Engine determines when an "actual process" has started and when it ends.

The term "concept" refers to an operational model for the facility. Each facility has predefined goals that, at some level, describe how successful operations at the facility have been. For example, an oil burning power plant inspector might want to monitor how efficiently it is using the oil. A weapons bunker inspector might track the integrity of its sensor system or some measure of likelihood of weapons diversion. An inspector of a facility forming nuclear material products might want to monitor safety of operations, or how closely procedures were executed.

The term "declaration" refers to the assertion (in the process declarations file) that an expected process was performed, along with the conditions specified that apply to that process (number of times it must occur, absolute time boundaries, relative time boundaries).

The term "destination" refers to the intersection of an event with a state in a state machine matrix. At any given time there may or may not be any object in the state associated with a destination. Typically, there are many destinations associated with a state; there is one destination for each event that can occur while an object is in the specified state. The destination file instructs the state machine which operations will be performed when an event happens and there is an object in the state defined by the destination.

The "Destination Description Language" is a computer language that is used to build the facility models. It has many of the constructs found in a general utility computer language (IF... THEN... ELSE, for example). It also has special statements that understand how to handle process models, facility layouts, sensor system characteristics, and state machine logic, timers, etc.

An "event" as used herein may be either an internal or external event. An external event is an indication that the state of the system being monitored has changed. Likewise, an event corresponds with a change of state in the objects or processes being modeled. In general, events will be significant in terms of advancing the processes within the state machine for the facility. External events are delivered to the facility state machine via the Event Generator. The facility state machine itself generates internal events. These internal events may be created by commands from the destination file (e.g., SEND event command) or as a result of changes in the state of the system (timer events, internal communication events, etc.).

The "Event Generator" is the device that reads the raw sensor data and converts the raw sensor data into events. It marks the raw sensor data with important points that indicate transitions in the state of the monitored processes. These points are the events. Once the events have been determined, they are delivered to an Analysis Engine to drive the facility state machine models.

The term "event rule" refers to the conditions that must occur before an event can be said to have occurred. The Event Generator examines sequences of data points and places marks on the data when certain conditions are fulfilled (e.g., local high, transition below a specified level, etc.). Similarly, when marks on the data with the right characteristics occur in the right order, an event is said to have occurred. The event rules define the sequence of marks that must occur to produce an event.

The term "Facility State Machine" is the model of the facility that is constructed for KG. It is built like a state machine and it defines the processes that can occur at the facility. The Facility State Machine tracks the states and locations of all of the objects that are used during operation of the facility. It also models any rules and regulations that must be observed. It can also model concepts like safety, security, integrity, confidence levels, etc.

The term "interval" is used herein in its conventional sense as a defined period of time. The Event Generator uses a defined interval of time when it is checking curve characteristics to see if the conditions needed to create a mark have been fulfilled. The facility site expert must define the length of all intervals as part of the facility model (within the event rules).

The term "Knowledge Generation" refers to the ability to extract high level knowledge about dynamic processes that were performed at a facility from very low-level sensor data.

The term "mark" refers to a curve characteristic determined by the nature of the curve (e.g., peak, valley, rise, fall, level, etc.). A mark meets a predetermined characteristic defined by the expert. The Event Generator combines marks in a defined fashion to determine whether or not an event has occurred.

The term "point" refers to a data point and is one sensor report at one time. A point may have more than one value associated with it. The Event Generator may combine information from many sensor data points to determine whether or not a mark has occurred.

The term "process" means a convenient aggregation of activities. It is used in four different ways:

Dynamic processes. These are the processes that occur at a facility that is being monitored by the sensor system.

Defined processes. These are the processes that are defined within the state machine model of the facility. These are the "allowed" processes.

Actual processes. These are the processes that were detected by the KG Analysis Engine as having actually occurred during the period of interest.

Declared processes. These are the processes that were expected during the period of interest that is being analyzed.

The term "sensor" refers to any device that detects changes of state in either the dynamic processes or objects being monitored.

The term "state" refers to the specific physical or abstract condition of an object being tracked by the user. When an object is created, its initial state must be specified. The state of an object may be changed when an event happens.

The term "variable" refers to a named value declared and maintained by the instructions in the state machine. A variable might track the number of times that a door was opened, or the level of fluid in a tank, or the confidence that a process is being performed safely. The user may declare a variable at any time from within the destination file and set its initial value at declaration. The user may change the value of a variable based on the current situation or the value of other variables. The Analysis Engine maintains variables per instructions given in the Facility State Machine 2. Description of One Embodiment The KG system for automating the analysis of large quantities of raw sensor data comprises modeling the system processes and the associated sensor suites with finite state machines, comparing the actual processes against a set of expected processes, and identifying concurrences and discrepancies between the set of expected processes and those processes that actually happened at the facility being monitored.

a) Initial Requirements for the KG Analysis

There are four initial requirements to perform a KG analysis. The analysis must be able to:

(1) Characterize the raw sensor data (in all forms of discrete, analog, or spectrum) so that process transition points ("events") can be identified within the sensor data. The KG system does this by allowing the user to specify a number of marks (absolute values, rise above a certain value, signal level for a defined period, many others) and to combine the marks to identify when an event has occurred. At this level, there is only simple information about the processes being monitored; points in the curve are identified, which identify transition points in the states of the monitored processes. This ability to detect "significant" transition points has the additional benefit of decreasing the sheer amount of raw sensor data that must be processed.

(2) Handle a plurality of dynamic processes that are going on simultaneously, and to track and advance the states of potentially many objects affected by those processes. To accomplish this, the events identified in the previous step are compared according to their ordering, relative magnitudes, and timing between them. Actual activities are then assembled from templates that describe the allowed activities. Those event sequences that meet the requirements specified by the template activities are classified as actual activities—those that actually occurred. The actual activities are then grouped using structures defined within the state machines into larger, inspector visible and comprehensible actual processes. To do this, the applicable parts of the following facility characteristics are modeled within the state machine:

attributes of the sensors themselves (the meaning of interrelated sensor states, timings, event sequencing, etc.).

process goals and constraints (how much needs to be produced, by when, using what equipment, operators, resources, etc.), physical layout of the facility (including space and time constraints), and safeguards and operational rules that apply to the processes (safety, security, sensor system health, etc.).

(3) Describe the allowed processes and operations of a facility in a machine interpretable language. A unique process-description language was developed which allows a facility expert to model the objects within the facility (application objects), the processes which are allowed (if desired, illegal operations can also be modeled), and concepts which are not normally tracked dynamically during process execution (for example, safe operation, security at all stages, likelihood of diversion, integrity of the sensor system itself, etc.). This language is referred to as the Destination Description Language. Each destination (intersection of an event with a state) in the state machine is modeled using this language. As events arrive at the state machine from the interpreted raw sensor data, the events transition objects from one state to another within the state machine. How an object transitions through its sequence of states, how processes are assembled from the sequences of object states, and how concepts (safety level, security, etc.) are computed are all defined for each destination by this process language.

(4) Construct and operate a state machine that describes a significant (in terms of the number of allowed states) facility without forcing the inspector to describe each of the huge number of possible states. The Analysis Engine, which runs the Facility State Machine, handles the processing of all destinations (potentially hundreds of thousands) that are not explicitly declared by the inspector. The Destination Description Language allows the inspector to declare only the states in which he is interested. These declared states would typically be:

all useful states for the application objects (things which the user cares about in terms of his processes);

states which describe how the application objects interact (e.g., a breakbeam activation might indicate that the location of a passing object had changed); and outlying states and sequences (e.g., states and sequences that might indicate diversion of hazardous materials could be explicitly defined).

b) The Knowledge Generation System

A block diagram of the functions required to perform a KG analysis is shown in FIG. 1. For the KG system to analyze what processes actually occurred at a facility it is preferred: to have available the full set of raw sensor data RSD from the dynamic processes being monitored; to know how to convert the raw sensor data RSD into events E according to event rules ER in an Event Generator EG that drives an Analysis Engine AE; and that the Analysis Engine AE know how each event E advances the state of the objects in the Facility State Machine FSM that models the allowed, defined processes through the destination definitions DD.

If desired, a Process Comparison Engine PCE can be given a declaration of what processes were expected to be performed at the facility (the declared processes DP). If such a process declarations file PD is available, the Process Comparison Engine PCE can compare the list of actual processes AP—those that the Analysis Engine AE determined actually occurred—against the declared processes DP. Both the normal and abnormal process behaviors are then output to the inspector through a User Interface UI.

(1) Definition of the Event Rules

Prior to performing a KG analysis, the event rules ER for the facility should preferably be defined. The facility characteristics FC of sensor attributes, process goals, facility layout, safeguards, and operational rules contribute their relevant information to the construction of the Process Model PM. The Process Model PM is used to construct event rules ER that describe how the Event Generator EG should interpret the raw sensor data RSD coming from the sensors and convert the raw sensor data RSD into events E. In a nuclear power plant, for example, if a gamma sensor rises from 0 mrem/hr to 250 mrem/hr, the Event Generator EG might include an event rule ER that said "when the gamma sensor rises about 200 mrem/hr that means the lid on the flask has been removed." The events E that are generated in the Event Generator EG are transmitted to the Analysis Engine AE.

Discrete sensors tend to have fairly straightforward event rules. Raw sensor data indicating "break-beam activated" could translate into the event "cart moved past break-beam." Analog sensors (radiation, temperature, etc.) tend to be more difficult to translate. However, a fairly simple event rule set applied to the raw analog data has been shown to properly extract good event sets from visually noisy analog sensor data. Spectrum data can be handled similarly by considering the reports through time at each frequency, then treating these reports as an analog stream.

(2) Construction of the Facility State Machine

Next, the Facility State Machine FSM should preferably be constructed, comprising a matrix of object state machines. In the Facility State Machine FSM, allowed processes are modeled as a set of coupled object state machines by defining the allowed states for all objects in the processes and all events that cause transitions between those object states according to the destinations.

Each allowed, or defined, process at the facility is modeled by the site expert as a destination file, using destination definitions DD taken from the Process Model PM. Each defined process can be broken into defined activities, which are the steps necessary to complete the defined process. In the nuclear power plant example, the defined process "move 60 bundles to the silo" might comprise defined activities such as: "bundles moved into a basket within a transfer flask", "flask dried", "basket lid welded on", and "basket moved to silo". Similarly, each defined activity is built up of finer sub-activities that are called "destinations." Destinations model what happens when an object in a given state receives an event that affects that object. Because a destination describes the response of the object state to a single event, all destinations are the lowest level.

The level of detail modeled at the defined activity level should closely reflect that which could be verified by the sensors installed at the facility. In the nuclear power plant example, if the gamma sensor on the grapple in the cooling pond goes above a predefined trigger level, that event signals that a bundle has been grabbed. This is sensor level interpretation. The "grabbed" signal, combined with the corresponding "released" signal (from the same sensor), represents the activity of moving one bundle from the tray to the basket.

The destination level of the model describes how the state of each object is transitioned by the events that affect those objects and is specified as a (state,event) pair. The first parameter in the pair is the current state of the object, and the second is the event that is to be processed. As an example, consider the state machine shown in Table 2 for a bundle having six (state,event) destinations. The destinations are (InTray,GrabEvent), (InTran,ReleaseEvent), (MovingToTurntable,GrabEvent), (MovingToTurntable, ReleaseEvent), (OnTurntable,GrabEvent), and (OnTurntable,ReleaseEvent).

TABLE 2

| State\Event | GrabEvent | ReleaseEvent |
| --- | --- | --- |
| InTray | MovingToTurntable | Error=BundleDropped |
| MovingToTurntable | Error=DoubleGrab | OnTurntable |
| OnTurntable | MovingToFlask | Etc. |

In this example, the bundle is initially in an object state "InTray". The first destination, (InTray,GrabEvent), tells the Analysis Engine AE what to do to the bundle when it is in the state "InTray" and the event "GrabEvent" occurs. This destination, therefore, instructs what happens when a bundle is grabbed. Among other things, the destination should transition the state of the bundle from "InTray" to "MovingToTurntable" in the bundle state machine. Now that the bundle is in state "MovingToTurntable" it can be advanced by the destination which instructs what to do to the grabbed bundle when the event "ReleaseEvent" arrives.

In the real world, an activity may affect not only the immediate object it acts upon, but also other objects in the system. In the nuclear power plant example, opening the lid on a flask of nuclear bundles not only moves the state of the flask from "closed" to "open", but it may also drive a nearby gamma sensor to a higher reading. For this reason, destinations are allowed to trigger other destinations by sending them internal "pseudo-events". With the use of these internal events, information is rippled up to higher level activities. For example, sometimes bundles can be dropped while moving from the tray to the turntable. To model such a possibility, the bundle state machine, shown in Table 2, would need to be expanded to include an event called "DroppedEvent". If the destination (MovingToTurntable, DroppedEvent) is executed, that destination might want to send an internal event called "BundleDroppedEvent" to a state machine tracking the concept "Track facility safety". "Track facility safety" receives the event and could bump a counter of incidents, decrease the value of a safety variable by 20%, or transition a concept object called "Facility safety" into a state called "Compromised."

It is at the lowest step in this analysis, the destination interpretation of events, that timing between events can be checked, sequencing between and among events can be checked, states of related objects can be checked, and values of computed variables can be changed or checked. Many other checks can be made, and other steps (updating a historical log, printing the current state of an object, etc.) performed, as required, at this level. It is important to capture both the normal state/event combinations and the abnormal combinations in the Facility State Machine FSM.

(3) Reconstruction of the Actual Processes

After the event rules ER are defined and the Facility State Machine FSM is constructed, the raw sensor data RSD from the dynamic processes being monitored can be input to the Event Generator EG. The Event Generator EG converts the raw sensor data RSD into events E, according to the event rules ER, and transmits the events E to the Analysis Engine AE. The Analysis Engine AE uses the events E to advance the Facility State Machine FSM through a sequence of object state transitions to reconstruct the actual processes that occurred at the facility.

The reconstruction involves the identification of the start and end of each activity. This is done as part of the processing within a destination. Each destination can declare itself to be the start, or end, of an activity or process. If a destination declares that it is the start of a process, a process object of the declared name is created. If a destination declares that it is the end of a process, the outstanding process object of that name is marked as complete. A process should have both a beginning and an end to be considered a complete process. The relationships grouping activities into actual processes are enforced by the processes that are defined for the facility.

(4) Comparison of Actual Processes to the Declared Processes

The last step in the KG analysis compares the list of expected processes declared by the facility inspector, the process declarations file PD, against the processes that were actually observed by the sensor suite, the actual processes AP. The input Expected Operations EO are converted into a list of declared processes DP that the site inspector expected to have happen during the period of interest. For example, a power plant inspector may declare an operation during which 240 bundles were moved from a cooling pond out to storage silos. The operation is broken down into declared processes DP; in this example there might be 4 declared processes (since 60 bundles are moved in one container) named "Move 60 bundles to the silo" and one declared process named "Cover and secure silo".

The process declarations file PD, comprising the list of declared processes DP, is fed to the Process Comparison Engine PCE that compares the declared processes DP against the list of actual processes AP as determined by the Analysis Engine AE. During the comparison, the Process Comparison Engine PCE can identify extra events or activities and point out missing events or activities. Timing between processes is checked, allowing both timeout (an event must occur before the timer expires) as well as timein (the event must not occur before the timer expires) events. Violations of timeout and timein rules are reported to the inspector. The comparison is output to the inspector through the User Interface UI.

c) Apparatus for the Knowledge Generation System

The KG apparatus comprises a processor connected with an input/output system and storage. For example, the processor can comprise a contemporary workstation with local storage such as a disc and semiconductor memory, input/output such as a sensor signal input means, keyboard, and user interface display. For example, PC-compatible platforms running Windows NT or Windows 2000 with a x86 compatible processor (386, 486, Pentium, etc.) are acceptable. To analyze small data sets (a few thousand events) requires approximately 4 mega-bytes (MB) of memory. Larger data sets require a somewhat larger memory. KG can also be run on most laptops. Available disk space should generally be 20 MB or above for best performance, again, depending on the complexity of the facility and the size of the data set being analyzed. Software and supporting data files are generally loaded from compact disk, so a CD reader is desirable at least during installation. In one embodiment of the invention, the KG system apparatus is a Dell OptiPlexGX110 (a PC-compatible platform based on a Pentium III processor) with 128 MB of RAM, 20 GB disk, and an internal CD reader/writer.

d) Application of Knowledge Generation

Figure 2:
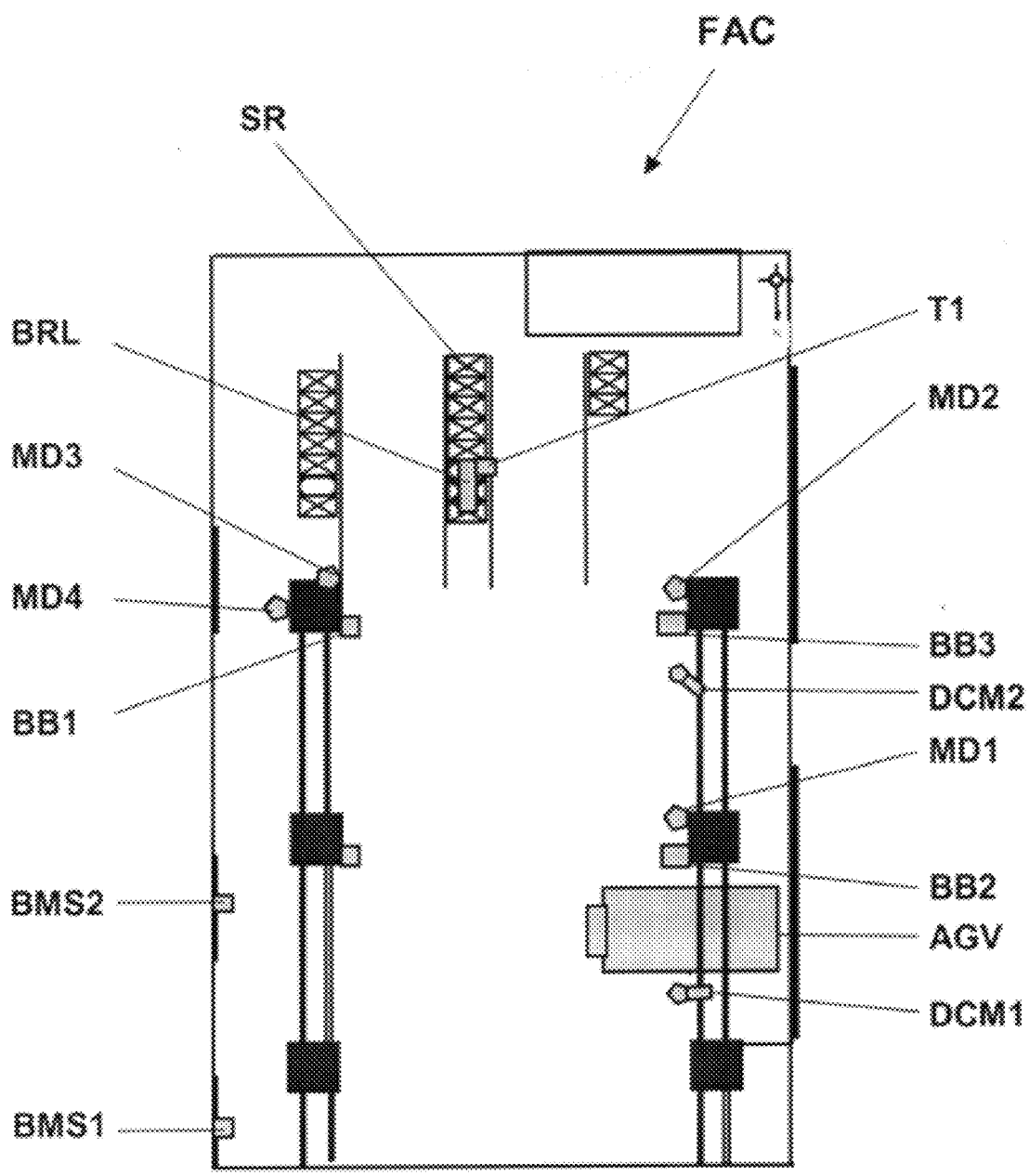
FIG. 2 is a schematic diagram of sensed facility upon which a KG analysis of a barrel retrieval and transportation simulation was performed.

The KG system has been used to analyze the raw sensor data from several operating facilities. A set of models was developed to analyze the processes at the facility FAC shown schematically in FIG. 2. The facility FAC is a robotics laboratory with sensors that are located on fixed objects (walls and pillars) as well as moving objects (the robots and the materials being monitored). It is a highly sensored facility with many different types of sensors, including balanced magnetic switches BMS1, BMS2, infrared motion detectors MD1, MD2, MD3, MD4, and break-beam sensors BB1, BB2, BB3. The primary purpose for the existing sensor suite was to monitor the facility FAC for possible diversionary activities (theft). However, because of the type and location of the sensors, it was possible to extract additional information about the states of the other ongoing processes at the facility FAC.

A scenario was constructed to simulate the retrieval of a large barrel BRL from a storage position on storage racks SR at a source location and transportation of the barrel BRL to a destination location. For the purposes of this scenario, the destination was the same as the source, both simulated by the facility FAC. The actual movement of the barrel BRL was made by an operator-less forklift, the Automated Guided Vehicle AGV. The AGV started from a known location in the facility FAC, went to the storage rack SR, raised its fork, lifted the barrel BRL, lowered the barrel BRL to ground level, then carried the barrel BRL to a truck door on an outside wall. A sensor pack T1 on the barrel BRL monitored motion of the barrel BRL and some attributes of the contents of the barrel BRL. Next, the barrel BRL was driven to and loaded onto a sensored truck, and the truck was driven to its destination (the truck actually left and later returned to the facility FAC in the simulation). While on the truck, the sensor T1 continued to monitor the motion and other features of the barrel BRL and its contents. When the truck returned to the facility FAC, the barrel BRL was removed from the truck and positioned on the floor. An overhead crane grappled the barrel BRL and carried it to its final location within the facility FAC. Throughout this entire scenario, sensors BMS1, BMS2, MD1, MD2, MD3, MD4, BB1, BB2, BB3 around the facility FAC detected, and cameras DCM1, DCM2 photographed, the motions of the involved robots, barrel, crane, and people.

To test the ability of. KG to detect and analyze undeclared activities, there was a deliberate modification to the routine scenario described above: the sensor pack T1 was removed from the barrel BRL, and only the sensor pack T1 was placed on the bed of the truck. Consequently, there was an undeclared activity in the raw sensor data RSD monitoring the process of the AGV picking up the barrel BRL and returning it to the storage racks SR. KG identified these extra activities and reported them to the inspector for further investigation.

(1) Event Rules

Prior to performing a KG analysis of the simulation, event rules ER for the facility sensors were defined. These event rules ER were used by the Event Generator EG to identify the events E in the raw sensor data RSD from all 24 sensors at the facility FAC. Table 3 shows the event rules for the sensor on the center door of the east wall, Door1, that was balanced magnetic switch BMS1. BMS1 was a discrete sensor which reported only two states: Closed (corresponding reported value is =0), or Open (=4). The Event Generator EG tagged each transition in this sensor as an "event" which it then transmitted to the event E to the Analysis Engine AE.

TABLE 3

SENSORS
Door1|Door1 Balanced Magnetic Switch 1 (BMS1) Data|Center door along East wall|DISCRETE|0|Closed|4|Open|
Door1-SOH|Door1 Balanced Magnetic Switch 1 (BMS1) State-of-health| Center door along East wall|DISCRETE|0|Report|

(2) Destination File

After the event rules were specified, each allowable activity at the facility FAC was modeled. These models were instructions to the Analysis Engine AE that ran the Facility State Machine FSM about what to do at each step. The instructions were contained in a destination file.

In particular, each allowed process was defined in terms of the destination definitions DD required to model the process. A destination, or (state,event) pair, defined what happened when an object in state "state" and incoming event "event" was transmitted to the Analysis Engine AE from the Event Generator EG. For example, a destination was defined as shown in Table 4.

TABLE 4

DESTINATION PeopleMotion Door1Open
CHANGE PeopleMotionCounter +1
// PRINT PeopleMotionCounter This destination described the instructions for the (state, event) pair (PeopleMotion,Door1Open). The object "Person" was initiated in state "PeopleMotion", so when event "Door1Open" came in from the sensor system (for example, a balanced magnetic switch sensor BMS1 that monitored the closed/open state of Door1), this destination was executed.

Within this destination the variable PeopleMotionCounter was incremented, so that when all of the data was analyzed, the Analysis Engine AE could report back sensor reports that could be ascribed to human motion. A destination file was generated to describe each of the 22 allowed process destination definitions for the facility FAC.

(3) Some High Level State Machines

Figure 3:
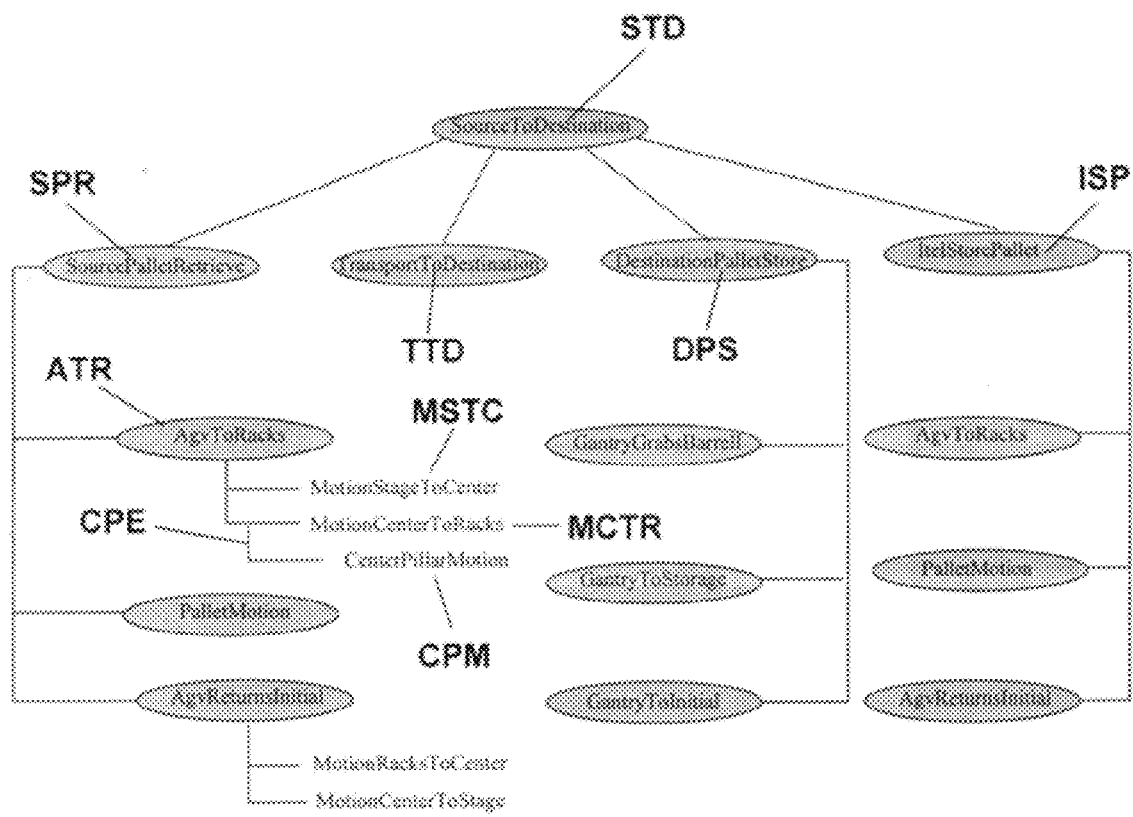
FIG. 3 shows the relationship of the high-level state machines in the simulation.

FIG. 3 shows the relationships of some of the high-level state machines in the simulation. The master process is SourceToDestination STD. This master process had four processes, SourcePalletRetrieve SPR, TransportToDestination TTD, DestinationPalletStore DPS, and ItelStorePallet ISP. Processes at this level were subdivided further into lower level processes and, if necessary, into activities. Also shown are a few of the lower level processes and activities, MotionStageToCenter MSTC, MotionCenterToRacks MCTR, and CenterPillarMotion CPM.

The lines connecting the processes are internal events that helped the higher level processes keep track of what state the lower level processes were in. Typically, the lower level process would send an internal event signal to the higher level process when it was completed. This internal event often advanced the higher level state machine so that it could start tracking the next process in the sequence of processes required for completion. Each of the connecting lines may represent one or more triggering events.

Table 5 shows the destination file for the Breakbeam Object, BBObject. Breakbeam2 sensor BB2 monitored motion in the vicinity of the center pillar. When Breakbeam2 sensor BB2 was broken, it sent an event CenterPillarEvent CPE from the activity CenterPillarMotion CPM to the activity MotionCenterToRacks MCTR, indicating that the Breakbeam Object was in motion at the center pillar. However, in the case shown, Breakbeam3 sensor BB3 at the south pillar did not trigger fast enough, suggesting that the Breakbeam Object was not the Automated Guided Vehicle AGV, but more likely a human. Therefore, the Automated Guided Vehicle was returned to the staging area and this activity was not part of the process AgvToRacks ATR.

TABLE 5

// DESTINATIONS for object BBObject (BreakBeam Object)
// Process CenterPillarMotion - moves BBObject from staging area
// to center.
// Sends CenterPillarEvent
//
// This model is a bit complicated because we do not want south pillar
// events to move the PillarObject when it is in the staging area.
// We do this by not creating the BBObject until we are ready
// to use it, and we destroy it as soon as we detect the motion
// we expected. This is a desentization in the model but it is
// necessary because of the huge amount of noise
// (caused by human motion) in the data.
DESTINATION QuiescentStaging Breakbeam2Broken
// The flags in the following MESSAGE command instruction the state
// machine engine to flag the "start" of the process
CenterPillarMotion.
MESSAGE *SN *FF *TP *PCenterPillarMotion *AS Motion between center pillars start.
// The SEND command signals a higher level process that something has happened.
SEND CenterPillarEvent
// Start a 60 second timer to make sure this is really the AGV.
START WaitForBB3Timer 60 BB3NotHitBeforeTimeout
NEXTSTATE QuiescentCenterOut
// We got BB2, but BB3 did not trigger fast enough to make us
// believe we really have the AGV - must be human motion.
DESTINATION QuiescentCenterOut BB3NotHitBeforeTimeout TABLE 5-continued MESSAGE *SN *FF *TP *PCenterPillarMotion *AI Center pillar motion not confirmed by south pillar motion.
// We got faked out by noise. Send the BBObject (ostensibly the Agv)
// back to the staging area.
NEXTSTATE QuiescentStaging

(4) Raw Sensor Data

A very small portion of the raw sensor data RSD gathered in the simulation is shown in Table 6. The actual data file from the simulation contained thousands of lines. Each line contains one data point from one sensor reading. Each data point entry contains the date and time the data point was taken, and the value of the reading. Each data point also identifies which sensor reported the data point. In the case of the first line of data in the file, Motion4 sensor MD4 detected motion (=1) at 1:30:28 PM on the $7^{th}$ of September. Motion4 MD4 returned to its normal state of no motion (=0) 44 seconds later. One sensor package, like the group of sensors collectively called T1, could have more than one sensor associated with it. For example, the T1 sensor package reported both motion and temperature. Each time the motion detection sensor reported (motion or no motion), another data point was created. Similarly, each time the thermometer reported, one data point was created (temperature at that instant).

TABLE 6

| | |
|---|---|
| 07-Sep-99 1:30:28 PM, 1, Motion4 | // Motion 4 sensor reports "Motion" |
| 07-Sep-99 1:30:30 PM, 0, Breakbeam2-SOH | |
| 07-Sep-99 1:30:38 PM, 1, T1 | |
| 07-Sep-99 1:30:40 PM, 0, T1 | |
| 07-Sep-99 1:30:50 PM, 4, Breakbeam1 | |
| 07-Sep-99 1:30:51 PM, 0, Breakbeam1 | |
| 07-Sep-99 1:30:53 PM, 4, Door2 | |
| 07-Sep-99 1:30:58 PM, 0, Door2 | |
| 07-Sep-99 1:31:12 PM, 0, Motion4 | // Motion 4 sensor reports "No Motion" |

(5) Process Declarations

To compare the actual processes that were performed during the simulation to the expected processes, the inspector constructed a process declarations file PD that declared to the Process Comparison Engine PCE the expected, or declared processes DP that were part of the expected operations EO. A declaration file, as shown in Table 7, was constructed for each data analysis. Each line in the file describes one activity in the whole process. In the middle of the declarations file are some lines, commented out as denoted by the starting keyword string "//", which describe the surreptitious return of the barrel BRL to the racks SR. Since these lines are commented out, when the Analysis Engine AE grouped actual activities that looked like the process ItelStorePallet ISP out of the event data, these actual activities were not found in the declared processes DP and were reported to the inspector as being "extra."

TABLE 7

SourceToDestination
   SourcePalletRetrieve
      AgvToRacks

TABLE 7-continued

```
            CenterPillarMotion
            SouthPillarMotion
        PalletInMotion
        AgvReturnsToInitial
            SouthPillarMotion
            CenterPillarMotion
    TransportToDestination
//  ItelStorePallet
//      PalletInMotion
//      AgvToRacks
//          CenterPillarMotion
//          SouthPillarMotion
//      AgvReturnsToInitial
//          SouthPillarMotion
//          CenterPillarMotion
    DestinationPalletStore
        PalletInMotion
        CenterPillarMotion   // The AGV goes to the racks.
        CenterPillarMotion   // The AGV returns to its staging
location.
```

(6) Comparison of Declared vs. Actual Processes

There were 22 declared processes DP for the simulation. The status of each of the declared processes was available to the inspector through the User Interface UI. The declared processes DP that were confirmed by the raw sensor data RSD were indicated as normal to the inspector. Those actual processes which were not declared, or which did not occur as defined in the process declarations file PD, were shown as abnormal. As described supra, eight processes were commented out in the process declarations file in Table 7, starting with ItelStorePallet ISP which corresponded with using the AGV to return the barrel BRL to the racks SR. A process summary display enabled the inspector to delve down into the details of the undeclared processes. The inspector could examine the raw sensor data RSD from the 24 sensors in as much detail as desired, right down to an individual data point. A sensor summary table display listed all of the sensors at the facility along with some of the attributes of each sensor, including the sensor name, a brief description of its location, the sensor's health, and the number of data reports (data points) that came from that sensor.

It will be understood that the above description is merely illustrative of the applications of the principles of the present invention. Other variations and modifications of the invention will be apparent to those of skill in the art.

We claim:

1. A method for remote facility inspection, comprising the steps of:
   a) gathering raw sensor data from a plurality of dynamic processes with a plurality of sensors during a period of interest;
   b) converting the raw sensor data into a plurality of events;
   c) advancing a state machine with the plurality of events from an initial state through a plurality of object state transitions to a final state, Wwerein the object state transitions comprise a plurality of transitioning steps whereby a destination at the intersection of each of a plurality of object states with each of the plurality of events within the state machine instructs an object to transition from a first state to a second state when an event happens and the object is in the object state defined by the destination;
   d) grouping the plurality of object state transitions into a plurality of actual processes performed at the facility during the period of interest;
   e) declaring a plurality of declared processes that an inspector expects to happen at the facility during the period of interest; and
   f) comparing the plurality of actual processes to the plurality of declared processes, thereby identifying undeclared processes performed at the facility during the period of interest.

2. The method of claim 1, wherein the converting step further comprises identifying a significant transition point in the raw sensor data as an event indicating a change in a process state of the facility.

3. An apparatus for remote facility inspection, comprising:
   a) a processor;
   b) storage accessible from the processor;
   c) an input system accessible from the processor;
   d) an output system accessible from the processor;
   e) a plurality of sensors for gathering raw sensor data from a plurality of dynamic processes;
   f) means for using facility characteristics from the input system and the processor to define a plurality of event rules in the storage;
   g) means for using facility characteristics from the input system and the processor to construct a state machine in the storage;
   h) means for converting the raw sensor data into a plurality of events according to the event rules;
   i) means for advancing the state machine with the plurality of events from an initial state through a plurality of object state transitions to a final state, the advancing means comprising a matrix further comprising a plurality of object states and the plurality of events and having a destination at the intersection of each of the plurality of object states with each of the plurality of events, wherein the destination instructs an object to transition from a first state to a second state when the an event happens and the object is in the object state defined by the destination;
   j) means for grouping the object state transitions into a plurality of actual processes performed at the facility during the period of interest;
   k) means for using the processor and the output system to communicate the actual processes;
   l) means for using expected operations from the input system and the processor to construct a plurality of declared processes in the storage; and
   m) means for comparing the plurality of actual processes to the plurality of declared processes to identify undeclared processes performed at the facility during the period of interest.

4. The apparatus of claim 3, wherein the destination is modeled with a destination description language.

5. The apparatus of claim 3, wherein the event rules identify significant transition points in the raw sensor data as a change in a process state of the facility.

* * * * *